US011809183B2

United States Patent
Yang et al.

(10) Patent No.: US 11,809,183 B2
(45) Date of Patent: Nov. 7, 2023

(54) SYSTEM AND METHOD FOR UNMANNED DRIVING OF VEHICLE

(71) Applicants: Hyundai Motor Company, Seoul (KR); Kia Motors Corporation, Seoul (KR)

(72) Inventors: Changmo Yang, Chungju-si (KR); Jin Seok Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 323 days.

(21) Appl. No.: 17/094,956

(22) Filed: Nov. 11, 2020

(65) Prior Publication Data

US 2021/0286356 A1   Sep. 16, 2021

(30) Foreign Application Priority Data

Mar. 12, 2020   (KR) .................. 10-2020-0030479

(51) Int. Cl.
*G05D 1/00*   (2006.01)
*H04W 4/40*   (2018.01)
*G05D 1/02*   (2020.01)

(52) U.S. Cl.
CPC ......... *G05D 1/0061* (2013.01); *G05D 1/0088* (2013.01); *G05D 1/0223* (2013.01);
(Continued)

(58) Field of Classification Search
CPC .. G05D 1/0088; G05D 1/0223; G05D 1/0227; G05D 1/0276; G05D 2201/0207; G05D 2201/0213; H04W 4/40
See application file for complete search history.

(56) References Cited

U.S. PATENT DOCUMENTS

| 8,137,008 B1* | 3/2012 | Mallano | F16M 11/18 52/110 |
| 2014/0156134 A1* | 6/2014 | Cullinane | B60R 22/48 701/23 |

(Continued)

OTHER PUBLICATIONS

Wiggers, Kyle, "Comma.ai launches Comma Two, a $999 kit that imbues cars with assisted driving features", Retrieved from the Internet: <URL: https://venturebeat.com/ai/comma-ai-launches-comma-two-a-999-kit-that-imbues-cars-with-assisted-driving-features/ >, Jan. 7, 2020 (Year: 2020).*

*Primary Examiner* — Khoi H Tran
*Assistant Examiner* — Tien Minh Le
(74) *Attorney, Agent, or Firm* — Slater Matsil, LLP

(57) ABSTRACT

A system for unmanned driving of a vehicle includes an autonomous driving kit with a detachable terminal having a modularized autonomous driving sensor and configured to support the autonomous driving function of the vehicle. The autonomous driving kit is configured to grasp a vehicle system including various controllers and various sensors applied to the vehicle through a vehicle communication unit of the vehicle and to control autonomous driving adapted to multiple vehicle types and options for each vehicle through cooperative control of the vehicle system and the autonomous driving sensor. A control server is configured to recognize the vehicle to which the autonomous driving kit is attached, provide a moving route of the vehicle, collect a moving state and surrounding conditions of the vehicle based on image information of cameras and transmit the information to the autonomous driving kit.

20 Claims, 6 Drawing Sheets

(52) U.S. Cl.
CPC ......... *G05D 1/0227* (2013.01); *G05D 1/0276* (2013.01); *H04W 4/40* (2018.02); *G05D 2201/0207* (2013.01); *G05D 2201/0213* (2013.01)

(56) References Cited

U.S. PATENT DOCUMENTS

| | | | | |
|---|---|---|---|---|
| 2016/0334790 | A1* | 11/2016 | Rust | B62D 5/04 |
| 2018/0265019 | A1* | 9/2018 | Dry | B60W 60/00 |
| 2019/0054966 | A1* | 2/2019 | Park | G07C 5/0891 |
| 2020/0166945 | A1* | 5/2020 | Kim | G01C 21/3889 |
| 2021/0245785 | A1* | 8/2021 | Suzuki | B60W 60/001 |

* cited by examiner

SYSTEM AND METHOD FOR UNMANNED DRIVING OF VEHICLE

CROSS-REFERENCE TO RELATED APPLICATIONS

This application claims the benefit of Korean Patent Application No. 10-2020-0030479, filed in the Korean Intellectual Property Office on Mar. 12, 2020, which application is hereby incorporated herein by reference.

TECHNICAL FIELD

The present invention relates to a system and a method for unmanned driving of vehicle.

BACKGROUND

In general, in a vehicle factory, a number of workers are employed day and night to transport a vehicle that has been mass-produced to a specific place, and a production logistics operation is in progress. For example, mass-produced vehicles are transferred to a large-scale parking lot, stored, and then transferred to a delivery site for delivery. In addition, in the case of an export vehicle, it may be transferred to the dock and then transferred into the cargo ship.

This production logistics operation consists of a task in which a number of workers directly drive individual vehicles and transfer them from the origin to the destination, and then return to the origin and repeat the transfer.

However, there is a problem in that a large number of manpower is required for rapid transport of mass-produced vehicles, which increases production and logistics costs, and if the number of workers is reduced, there is a problem that vehicle transport is delayed. In addition, there is a problem in that vehicle damage may occur due to negligence in driving due to the nature of the operator driving and transporting the vehicle directly.

In order to improve this problem, recently, a method of transporting a vehicle by unmanned driving by utilizing the autonomous driving function of an autonomous vehicle has been proposed.

However, this is possible in the case of some autonomous vehicles, but there is a limit to solving the fundamental problems in the production and logistics work because most of the general vehicles do not have an autonomous driving function and it is therefore impossible.

The above information disclosed in this Background section is only for enhancement of understanding of the background of the invention, and therefore it may contain information that does not form the prior art that is already known in this country to a person of ordinary skill in the art.

SUMMARY

The present invention relates to a system and a method for unmanned driving of vehicle. Particular embodiments relate to a system and a method for unmanned driving of a vehicle in a factory for temporarily granting an autonomous driving function to multi-vehicle multi-option general vehicles produced in the factory.

Embodiments of the present invention provide a system and a method for unmanned driving of a vehicle in a factory that supports autonomous driving functions adapted to multiple vehicle types and options through cooperative control with the vehicle system by attaching an autonomous driving kit to a general vehicle mass-produced in a vehicle factory.

According to an exemplary embodiment of the present invention, a system for unmanned driving of a vehicle not equipped with an autonomous driving function in a factory includes an autonomous driving kit that is a detachable terminal in which an autonomous driving sensor is modularized to support the autonomous driving function of a vehicle, and for grasping a vehicle system including various controllers and various sensors applied to the vehicle through a vehicle communication unit of the attached vehicle and for controlling autonomous driving adapted to multiple vehicle types and options for each vehicle through cooperative control of the vehicle system and the autonomous driving sensor unit, and a control server that recognizes the vehicle to which the autonomous driving kit is attached and provides a moving route of the vehicle and collects the moving state and surrounding conditions of the vehicle based on the image information of the cameras arranged in the factory and transmits it to the autonomous driving kit.

Further, the autonomous driving kit may include a vehicle connection unit for connecting vehicle communication with the vehicle communication unit of the vehicle, a server connection unit connected to the control server to transmit and receive data, an alarm unit for expressing an event situation occurring during autonomous driving of the vehicle to a worker, a state information detection unit that recognizes an option of the vehicle system and selects and activates an additional function insufficient for autonomous driving control by the autonomous driving sensor unit, and an autonomous driving control unit that controls the operation of each unit to provide an autonomous driving function according to the vehicle type and option of the vehicle.

Further, the autonomous driving kit may further include a housing on which the configuration of each part is mounted, an attachment unit attached to an upper surface of a roof through a plurality of magnets by a bracket made to fit the curve of the roof of each vehicle and on which the housing is seated, and an angle adjustment unit for adjusting the angle of the camera module built-in left and right through an actuator connected to a motor and a gear inside the housing.

Further, the vehicle communication unit may collect state information of various sensors in the vehicle and transmit it to the autonomous driving kit, and transmit the autonomous driving control signal received from the autonomous driving kit to MDPS (Motor Driven Power Steering), ECS (Electronic Control Suspension), and at least one controller of ESC (Electronic Stability Control) and electronic TCU (Transmission Control Unit).

Further, the server connection unit may transmit the wireless OBD (On-Board Diagnostics) ID of the vehicle obtained from the vehicle communication unit to the control server and receive the vehicle type and option of the vehicle matched with the wireless OBD ID.

Further, the autonomous driving sensor unit may include a V2X module including at least one of vehicle-to-vehicle communication (V2V), vehicle-to-infrastructure communication (V2I), and vehicle-to-mobile device communication (V2N) for autonomous driving control, a camera module that recognizes an obstacle and a road environment in front through image recognition technology, a LIDAR module that radiates a laser to measure the distance to obstacles around the vehicle, and a position recognition module for measuring indoor and outdoor vehicle positions using at least one of a Differential Global Positioning System (DGPS) and an Ultra-Wideband (UWB).

Further, the state information detection unit may actively utilize various sensors that can be used for autonomous driving control in the vehicle system, but for insufficient functions, each module of the autonomous driving sensor unit may be selectively utilized.

Further, the state information detection unit may collect vehicle state information collected from various sensors of the vehicle system and information detected by driving a selected module of the autonomous driving sensor unit and transmit the collected information to the autonomous driving control unit.

Further, the autonomous driving control unit may calibrate the attachment state by adjusting the angle of the camera module considering the vehicle type and option to the zero point of the vehicle body when the autonomous driving kit is attached to the vehicle, and recognize the left and right headlamps of the vehicle through the camera module, and correct the center of the vehicle to match the reference zero point of the vehicle body.

Further, the control server may perform a control state calibration for compensating an error in the vehicle control command by comparing the vehicle control command transmitted to the autonomous driving kit to the vehicle control command transmitted to the autonomous driving kit and the moving state of the vehicle measured by the image information of the camera.

Further, the autonomous driving control unit may initiate autonomous driving control through cooperative control with the vehicle system and transfer the vehicle to a destination determined by the movement route when a movement route is received from the control server, then transmit transfer completion information to the control server upon reaching the destination.

Further, the control server may include a transmission/reception unit for connecting wireless communication with the autonomous driving kit and the vehicle communication unit through an antenna disposed in the factory, a transmission/reception unit for connecting wireless communication with the autonomous driving kit and the vehicle communication unit through an antenna disposed in the factory, a database (DB) for matching and storing the vehicle model, option information and OBD ID based on the vehicle identification number (VIN) of the produced vehicle, and for storing information generated according to the operation of the autonomous driving kit, and a central processing unit that recognizes a vehicle attached through communication with the autonomous driving kit, generates current location information of the vehicle and a movement path according to a process step, and transmits the information to the autonomous driving kit.

Further, the central processing unit may collect image information of the camera photographing a top view in the factory and monitor the moving state of the vehicle based on image sensing.

Meanwhile, a method for unmanned driving of a vehicle of an autonomous driving kit for unmanned transportation of general vehicles produced in a factory according to an exemplary embodiment of the present invention includes a) attaching to the vehicle, identifying a vehicle system option through a vehicle communication unit, and setting an additional function insufficient for autonomous driving control in the autonomous driving sensor unit, b) receiving a movement route from a control server and, if an electronic transmission control unit (TCU) exists in the vehicle system, applying a driving signal to control the D-speed (drive-speed) shift, c) releasing a brake and initiating autonomous driving control through cooperative control of the vehicle system and the autonomous driving sensor unit, and d) applying a parking signal to the electronic TCU when reaching a destination determined by the movement path to control a P-speed (parking-speed) shift.

Further, the a) step may include selectively activating at least one of a V2X module, a camera module, a LIDAR module, and a location recognition module as the additional function.

Further, the method for unmanned driving of the vehicle in the factory may further include between the a) step and b) step, performing attachment state calibration including recognizing the left and right headlamps of the vehicle through the camera module and correcting its center to the reference zero point of the vehicle body, and performing a control state calibration including compensating the error of the vehicle control command by comparing the vehicle control command and the actual vehicle movement state through a pre-driving test with the control server.

Further, the d) step may include measuring the location of indoor and outdoor vehicles acquired through the location recognition module including the high-precision map data (MAP) in the factory and DGPS (Differential Global Positioning System) or UWB (Ultra-Wideband) to determine that the destination has been reached.

Further, the b) step may include alarming the D-speed shift to the operator by operating the alarm unit if electronic shift control is impossible because the above electronic TCU does not exist, and checking the D-speed shift of the vehicle transmission from the vehicle state information.

Further, the d) step may include operating the alarm unit to alarm the operator of the P-speed shift, and checking the P-speed shift of the vehicle transmission from the vehicle state information.

Further, the method for unmanned driving of the vehicle in the factory may further include after the d) step, transmitting complete vehicle transfer information to the control server, and completing vehicle transfer upon receiving a response message confirmed by monitoring the vehicle movement state of the control server.

According to an exemplary embodiment of the present invention, there is an effect that can reduce manpower and costs that are put into production and logistics work by attaching an autonomous driving kit to a general vehicle and transporting it to a designated destination through unmanned autonomous driving adapted to multiple vehicle types and options.

Further, there is an effect of preventing vehicle damage due to negligence of driving by existing workers by monitoring the vehicle's movement status in the control server and controlling the vehicle's movement status in an emergency situation.

Further, there is an effect that the problem of delayed vehicle transport even with less manpower than before can be improved by operating a number of autonomous driving kits.

Figure 1:
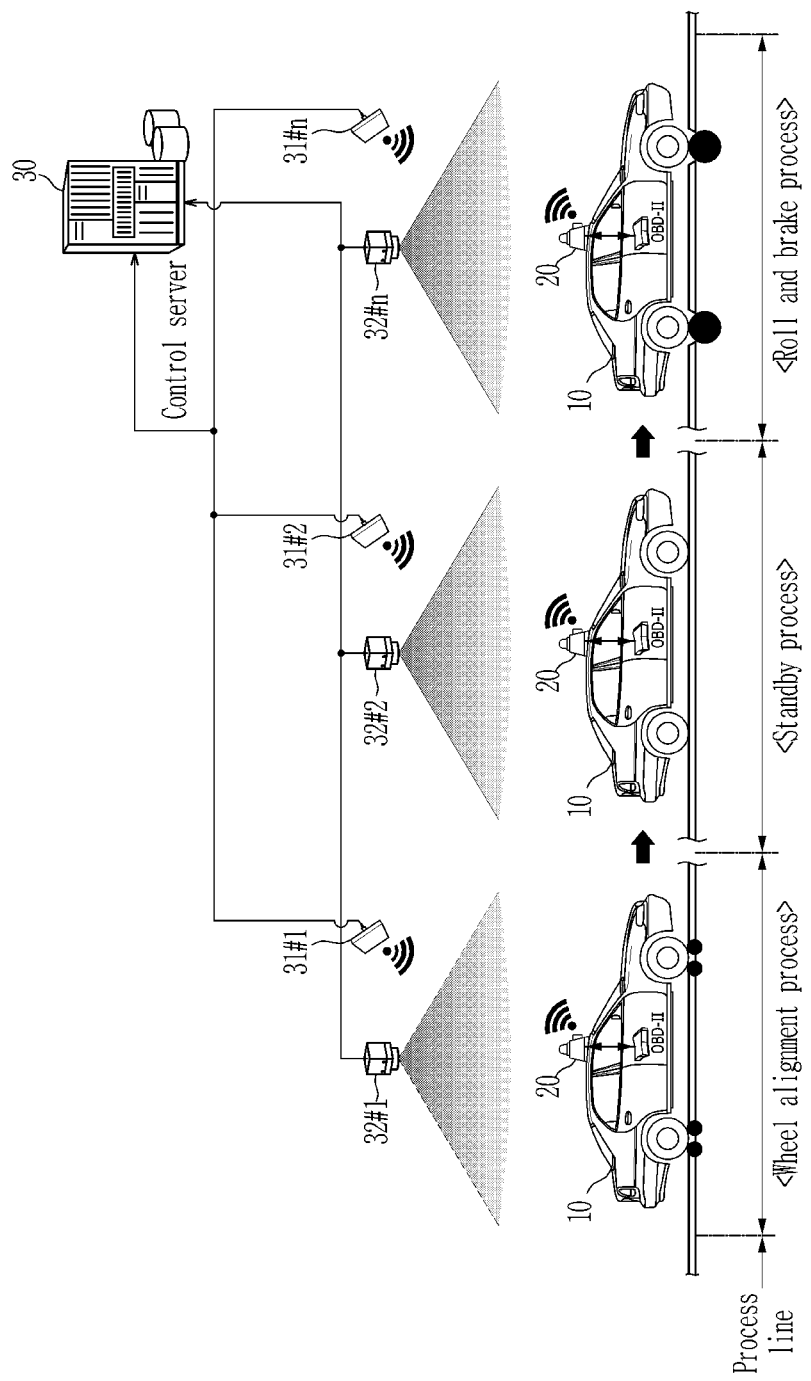
FIG. 1 is a block diagram showing a network configuration of a system for unmanned driving in a factory according to an exemplary embodiment of the present invention.

The following reference numbers can be used in conjunction with the drawings:

10: vehicle
11: vehicle communication unit
20: autonomous driving kit
21: vehicle connection unit
22: server connection unit
23: alarm unit
24: state information detection unit
25: autonomous driving sensor unit
251: V2X module
252: camera module
253: LIDAR module
254: position recognition module
26: autonomous driving control unit
27: housing
28: angle adjustment unit
29: attachment unit
30: control server
31: antenna
32: camera
33: transmission/reception unit
34: interface unit
35: DB
36: central processing unit

DETAILED DESCRIPTION OF ILLUSTRATIVE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

Throughout the specification, terms such as first, second, 'A', 'B', '(a)', '(b)', and the like will be used only to describe various elements, and are not to be interpreted as limiting these elements. These terms are only for distinguishing the constituent elements from other constituent elements, and the nature or order of the constituent elements is not limited by the term.

Now, a system and a method for unmanned driving of a vehicle in a factory according to an exemplary embodiment of the present invention will now be described in detail with reference to the drawings.

FIG. 1 is a block diagram showing a network configuration of a system for unmanned driving in a factory according to an exemplary embodiment of the present invention.

Figure 2:
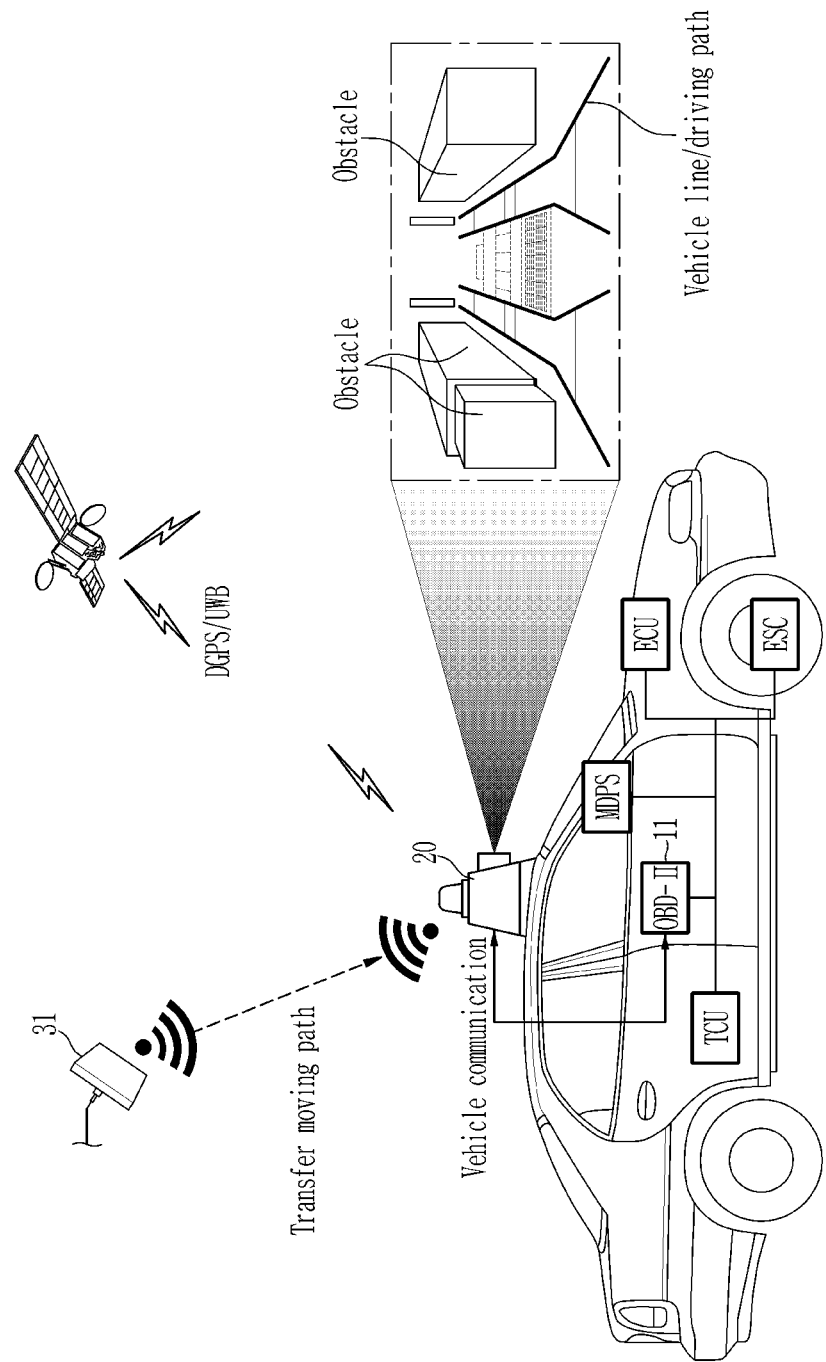
FIG. 2 shows a state in which the autonomous driving kit is attached to a vehicle according to an exemplary embodiment of the present invention.

FIG. 2 shows a state in which the autonomous driving kit is attached to a vehicle according to an exemplary embodiment of the present invention.

Referring to FIG. 1 and FIG. 2, a system for unmanned driving in a factory according to an exemplary embodiment of the present invention includes a vehicle 10, an autonomous driving kit 20 and a control server 30.

The vehicle 10 is a finished product that has been assembled in a vehicle factory and may be a general vehicle not equipped with an autonomous driving function.

The autonomous driving kit 20 is a detachable terminal in which various sensors supporting an autonomous driving function are modularized. In addition, the autonomous driving kit 20 is attached (mounted) to the vehicle 10 and provides autonomous driving functions adapted to multiple vehicle types and options through cooperative control with the vehicle system through the vehicle communication unit (OBD-II, 11). Here, the vehicle system collectively refers to a vehicle communication unit 11 provided in the vehicle, various vehicle controllers required for driving, and various sensors (Advanced Driver Assistance Systems, ADAS) that assist driving. In addition, the multi-vehicle model refers to a vehicle type or vehicle model, and the multi-option refers to an option or a function thereof applied differently according to specifications even in the same vehicle type/model.

The control server 30 centrally manages the operation of the autonomous driving kit 20 and the production and logistics movement of the vehicle 10 through infrastructure facilities such as the transmission/reception antenna 31 and the camera 32 disposed in the factory.

The control server 30 determines a moving path by recognizing the vehicle 10 to which the autonomous driving kit 20 is attached, and collects the surrounding situation of the moving vehicle 10 through an infrastructure facility such as a camera 32 and transmits it to the autonomous driving kit 20.

Hereinafter, configurations of the vehicle 10, the autonomous driving kit 20, and the control server 30 will be described in detail through FIG. 3.

Figure 3:
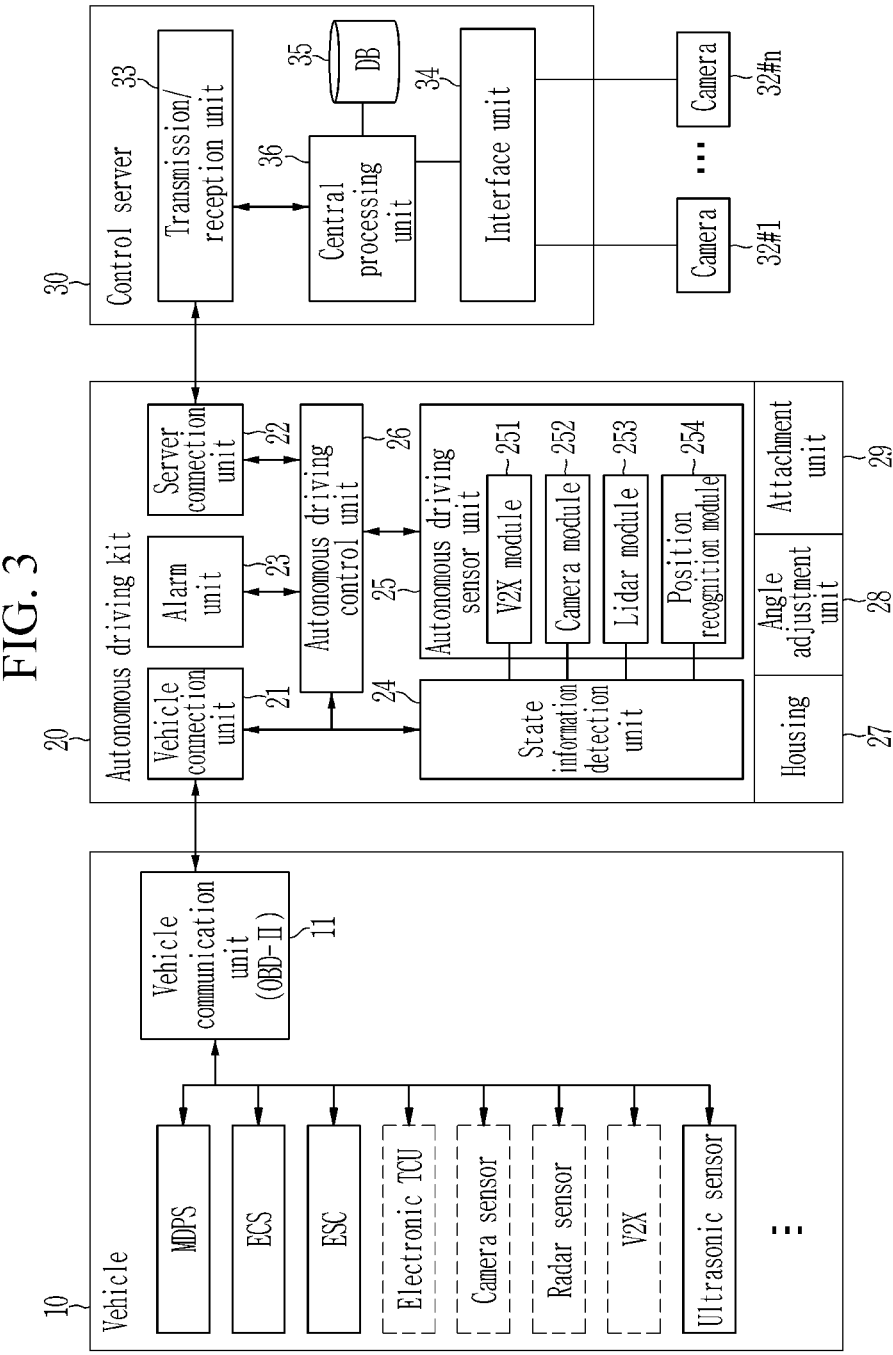
FIG. 3 is a block diagram schematically showing each configuration of a system for unmanned driving in a factory according to an exemplary embodiment of the present invention.

FIG. 3 is a block diagram schematically showing each configuration of a system for unmanned driving in a factory according to an exemplary embodiment of the present invention.

Referring to FIG. 3, in the vehicle 10 according to an exemplary embodiment of the present invention, since a vehicle factory produces a variety of vehicle types and multiple options, essential configurations are indicated by solid lines and optional configurations are indicated by dotted lines.

The vehicle 10 includes a vehicle communication unit 11 and MDPS (Motor Driven Power Steering) for steering control, ECS (Electronic Control Suspension) for acceleration/deceleration control, Electronic Stability Control (ESC) for braking control, and one or more ultrasonic sensors. In addition, the vehicle 10 may further include at least one of a transmission control unit (TCU) for electronic shift control, a camera sensor, a radar sensor, and a vehicle to everything (V2X) as an option.

The TCU refers to an electronic TCU capable of shifting according to an applied control signal rather than a mechanical shift control, and an unmanned driving control method described later may vary depending on whether such an electronic TCU is configured.

In addition, camera sensors, radar sensors and V2X can be selectively applied for each vehicle to support various optional functions such as Lane Keeping Assist System (LKAS), Autonomous Emergency Braking System (AEB), and Advanced Driver Assistance Systems (ADAS). The V2X generally refers to wireless communication for autonomous driving, but may be mounted on a general vehicle to which the ADAS function is applied.

The vehicle communication unit 11 may be composed of a wireless OBD (OBD-II), and it serves to connect the short-range wireless communication (also referred to as vehicle communication) of the vehicle system, which is commonly referred to as the above detailed configuration, and the autonomous driving kit 20.

The vehicle communication unit 11 may be connected to the vehicle system through at least one communication line of a controller area network (CAN), a local interconnect network (LIN), a FlexRay, and an Ethernet.

The vehicle communication unit 11 detects obstacles and road environments around a general vehicle without an autonomous driving function by the autonomous driving kit 20, and the vehicle communication unit 11 may transmit state information of various sensors so as to drive an unmanned transport to a predetermined position through unmanned driving control (autonomous driving control). In addition, the vehicle communication unit 11 transmits the autonomous driving control signal received from the autonomous driving kit 20 to various controllers such as MDPS, ECS, ESC, and TCU to perform each function. Through this, a general vehicle 10 without an autonomous driving function can be transferred to a predetermined destination through the unmanned driving control of the autonomous driving kit 20.

The autonomous driving kit 20 is equipped with various sensors and communication functions to support the unmanned autonomous driving function in the general vehicle 10. The autonomous driving kit 20 is detachably attached to the general vehicle 10 to perform unmanned driving control adapted to multiple options of a vehicle. In the exemplary embodiment of the present invention, it is expressed that the autonomous driving kit 20 grants and supports a temporary autonomous driving function for unattended transportation of the general vehicle 10.

The autonomous driving kit 20 includes a vehicle connection unit 21, a server connection unit 22, an alarm unit 23, a state information detection unit 24, an autonomous driving sensor unit 25, and an autonomous driving control unit 26. Here, the autonomous driving kit 20 may further include a housing 27 constituting a main body, an angle adjustment unit 28 and an attachment part 29.

The vehicle connection unit 21 connects the vehicle communication unit 11 and vehicle communication to receive status information measured by various sensors in the vehicle, and transmits autonomous driving control signals to various controllers in the vehicle.

The server connection unit 22 is connected to the control server 30 through an antenna 31#1 disposed in the vehicle factory to transmit and receive data.

The server connection unit 22 transmits the wireless OBD ID of the vehicle 10 to which wireless communication is connected to the control server 30, and receives vehicle types and options according to the vehicle ID (e.g., VIN) matched with the wireless OBD ID.

The server connection unit 22 transmits, to the control server 30, an autonomous driving preparation completion message in which the linkage check between the vehicle system and the autonomous driving kit 20 is completed, and the server connection unit 22 receives a movement path for autonomous driving control, camera-based vehicle movement state information, and a control command from the control server 30. The control command may be a command for stopping the vehicle when an emergency event occurs by monitoring a transport state of the vehicle.

The server connection unit 22 may transmit location information and driving state information according to the unmanned autonomous driving of the vehicle 10.

The alarm unit 23 may visually and audibly express an emergency event situation occurring during autonomous driving of the vehicle 10 to a worker. To this end, the alarm unit 23 may be provided with a warning light and a speaker.

On the other hand, since the autonomous driving kit 20 can be attached to a multi-vehicle and multi-option vehicle 10, it is very important to implement autonomous driving control in consideration of the vehicle type and option of the vehicle.

Accordingly, the state information detection unit 24 first identifies an option (function) of the vehicle system from the attached general vehicle 10, and selects and activates an additional function insufficient for autonomous driving control by the autonomous driving sensor unit 25.

The autonomous driving sensor unit 25 is a modularized device in which various sensors and communication means for detecting the surrounding environment based on location recognition are integrated to support the autonomous driving function. For example, the autonomous driving sensor unit 25 may include a V2X module 251, a camera module 252, a LIDAR module 253, and a location recognition module 254.

The V2X module 251 refers to all types of communication technology applicable to vehicles on the road. The V2X module 251 includes a vehicle-to-vehicle communication (V2V), vehicle-to-infrastructure communication (Vehicle-to-Infra, V2I), and a vehicle-to-mobile device communication (Vehicle-to-Nomadic Devices, V2N).

The camera module 252 recognizes an obstacle and a road environment in front through image recognition technology.

The LIDAR module 253 measures the distance to obstacles around the vehicle by emitting a laser.

The location recognition module 254 measures indoor and outdoor precise locations using DGPS (Differential Global Positioning System)/UWB (Ultra-Wideband) based technology.

The state information detection unit 24 actively utilizes various sensors available for autonomous driving control in the vehicle system, and selectively utilizes each module of the autonomous driving sensor unit 25 to collect each sensed information. Here, the reason why the state information detection unit 24 actively utilizes various sensors of the vehicle system is that the various sensors assembled in the finished vehicle 10 have already been optimized in the assembly process and thus their reliability has been verified.

When putting these things together, the state information detection unit 24 may collect vehicle state information collected from various sensors of the vehicle and information sensed by selective module driving of the autonomous driving sensor unit 25 and transmit it to the autonomous driving control unit 26.

The autonomous driving control unit 26 controls the overall operation of each unit in which the autonomous driving kit 20 according to an exemplary embodiment of the present invention provides an autonomous driving function adapted to multiple vehicle types and options.

The autonomous driving control unit 26 controls the overall operation of each unit in which the autonomous driving kit 20 according to an embodiment of the present invention provides an autonomous driving function adapted to multiple vehicle types and options.

When the autonomous driving kit 20 is attached to the vehicle 10, the autonomous driving control unit 26 connects wireless communication with the vehicle 10 and the control server 30, respectively. At this time, the autonomous driving control unit 26 inquires the vehicle type, option information and OBD ID based on the vehicle identification number (VIN) of the vehicle 10 from the control server 30, and connects the vehicle communication through the OBD ID.

The autonomous driving control unit 26 checks functions usable for autonomous driving control in the vehicle system through the state information detection unit 24 and activates modules (functions) that require support from the autonomous driving sensor unit 25.

For example, the autonomous driving control unit 26 transmits test signals to various sensors and controllers of the vehicle system, and when all response signals are received, transmits a standby signal that is ready for autonomous driving to the control server 30. At this time, the autonomous driving control unit 26 may calibrate the attachment state of the autonomous driving kit 20 and calibrate the control state.

Figure 4:
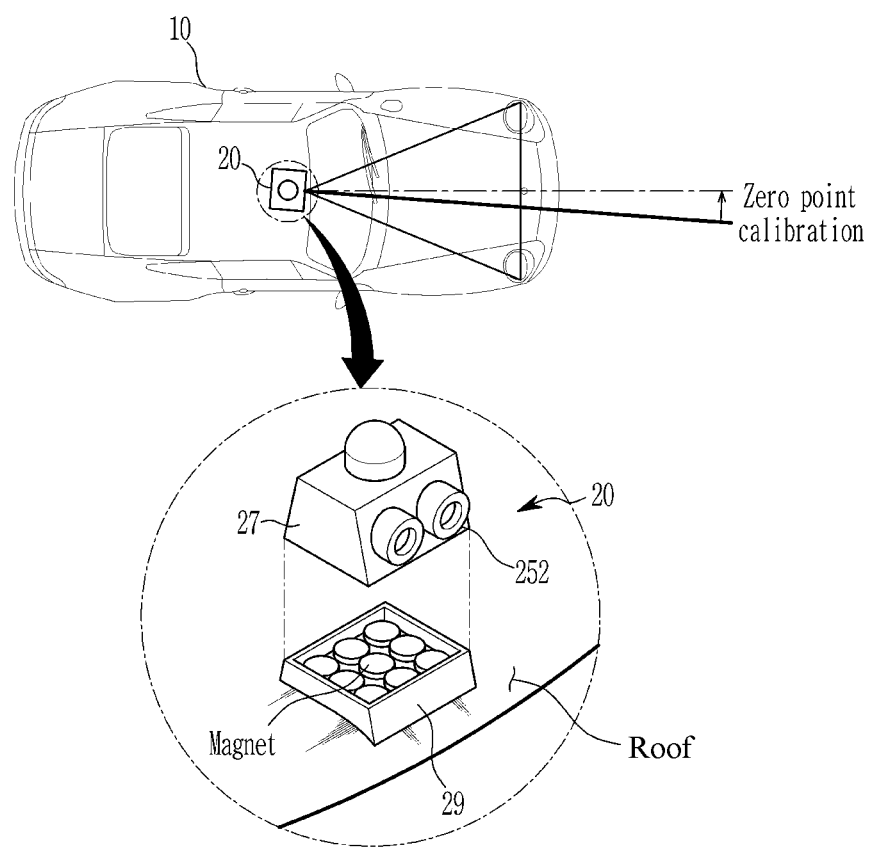
FIG. 4 shows a method of calibrating the attachment state of an autonomous driving kit according to an exemplary embodiment of the present invention.

For example, FIG. 4 shows a method of calibrating the attachment state of an autonomous driving kit according to an exemplary embodiment of the present invention.

Referring to FIG. 4, the housing 27 of the autonomous driving kit 20 mounts the configuration of each part and is attached to the center of the roof of the vehicle 10 by the attachment part 29.

The attachment part 29 is a bracket manufactured to fit the curved surface of the roof for various vehicle types, and is attached to the upper surface of the roof through a plurality of magnets, and the housing 27 is seated and fastened thereon.

The angle adjustment unit 28 may adjust the angle of the camera module 252 left and right through an actuator structure in which a motor and a gear inside the housing 27 are connected.

When the autonomous driving kit 20 is attached to the vehicle 10, the autonomous driving control unit 26 calibrates the angle of the camera module 252 in consideration of the vehicle type and option of the vehicle 10 to the zero point of the vehicle body.

The autonomous driving control unit 26 recognizes the left and right headlamps of the vehicle through the camera module 252 while the autonomous driving kit 20 is attached to the vehicle 10 and corrects the center of the vehicle to match the reference zero point of the vehicle body.

In the above description, it has been described that the autonomous driving kit 20 is attached to the roof of the vehicle, but the embodiments of the present invention are not limited thereto, and it may be attached to one of the driver's headrest inside the vehicle, the top of the clash pad, and the windshield. Therefore, depending on the attachment portion, the attachment portion such as an adsorption plate or a mounting bracket can be appropriately changed.

On the other hand, since the autonomous driving kit 20 can be attached to a multi-vehicle and multi-option vehicle 10 produced in a vehicle factory, a correction method capable of controlling and adapting to the change is required. For example, the vehicle 10 has differences in weight and performance of parts according to vehicle types and options, and thus vehicle systems such as steering, driving, and braking may be applied differently. Therefore, when the autonomous driving kit 20 simply calibrates with only the specifications of the vehicle (e.g., body size, tire size), a minute control error may occur in the interlocking process between vehicle systems.

In order to solve this, the autonomous driving kit 20 performs a control state calibration process that compares and corrects the actual movement state with the direct autonomous driving control of the attached vehicle 10 after the attachment state calibration of FIG. 4 is performed.

Figure 5:
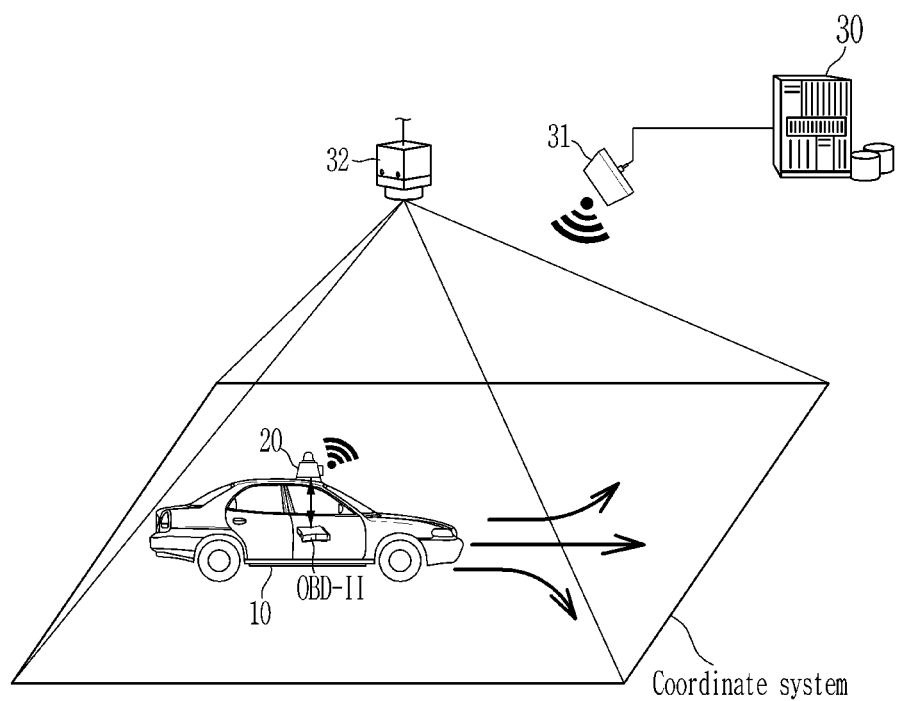
FIG. 5 shows a vehicle control calibration method of an autonomous driving kit according to an exemplary embodiment of the present invention.

FIG. 5 shows a vehicle control calibration method of an autonomous driving kit according to an exemplary embodiment of the present invention.

Referring to FIG. 5, the calibration of the control state of the autonomous driving kit 20 according to an exemplary embodiment of the present invention can be performed at any place where the camera 32 is placed in the vehicle factory by interlocking with the control server 30.

The control server 30 connects the autonomous driving kit 20 attached to the vehicle 10 and wireless communication, and analyzes the image captured by the camera 32 to determine the vehicle location.

The control server 30 transmits a vehicle control command including steering, driving, and braking calculated for a vehicle driving test in advance based on the vehicle position to the autonomous driving kit 20. Then, the control server 30 measures the driving state of the vehicle 10 based on the image of the camera 32. The control server 30 may calculate a steering angle, a moving path, and a moving distance of the vehicle according to the driving state measurement.

The control server 30 corrects the error of the vehicle control command by calculating an error according to the vehicle control command and the driving state of the vehicle. Therefore, even if the autonomous driving kit 20 is attached to various vehicle types, it is corrected with a vehicle control command optimized thereto and has the advantage of performing precise autonomous driving control.

The autonomous driving control unit 26 transmits a standby signal to the control server 30 when all calibrations are completed.

Thereafter, when a movement route is received from the control server 30, the autonomous driving control unit 26 starts autonomous driving control through cooperative control with the vehicle system and transfers the vehicle 10 to a destination determined by the movement route.

Thereafter, when the location information of the vehicle 10 reaches the destination, the autonomous driving control unit 26 transmits the transfer completion information to the control server 30.

Meanwhile, the control server 30 centrally manages the production and logistics movement of the vehicle 10 according to the operation of the autonomous driving kit 20 through infrastructure facilities such as the transmission/reception antenna 31 and the camera 32 arranged in the factory.

The control server 30 may include a transmission/reception unit 33, an interface unit 34, a DB 35, and a central processing unit 36.

The transmission/reception unit 33 connects wireless communication with the server connection unit 22 of the autonomous driving kit 20 through the transmission/reception antenna 31 disposed in the factory.

In addition, the transmission/reception unit 33 may recognize and communicate with the OBD mounted on the vehicle 10 through the transmission/reception antenna 31.

The interface unit 34 collects image information of the vehicle 10 photographed by the camera 32 disposed in the factory. In addition, the interface unit 34 may connect the control server 30 with various facilities and infrastructure systems in the factory.

The DB 35 stores various programs and data for the operation of the vehicle unmanned driving system in the vehicle factory using the autonomous driving kit 20, and stores data generated according to the operation.

The DB 35 matches and stores the vehicle type, option information, and OBD ID based on the vehicle identification number (VIN) of the vehicle 10 produced in the vehicle factory. In addition, it identifies the vehicle 10 to which the autonomous driving kit 20 is attached and stores information generated according to its operation.

The central processing unit 36 is a CPU (Central Processing Unit) of the control server 30. The central processing unit 36 centrally controls the operating state of the autonomous driving kit 20 for operating the unmanned vehicle driving system and the moving state of the attached vehicle 10.

The central processing unit 36 recognizes the attached vehicle 10 through communication with the autonomous driving kit 20. Then, the central processing unit 36 generates the current location information of the vehicle 10 and a movement path according to the process step, and transmits the generated information to the autonomous driving kit 20. The movement path may include a transfer path between a preceding process and a subsequent process of the vehicle, and a transfer path for the production and distribution work.

The central processing unit 36 monitors the moving state of the image sensing-based vehicle 10 by collecting image information of the camera 32 photographing the top view in the vehicle factory. Then, the central processing unit 36 measures the movement information, performs vehicle control calibration, and provides it to the autonomous driving kit 20. The movement information may be used as infrastructure information for autonomous driving control of the autonomous driving kit 20.

Meanwhile, a method of unmanned vehicle driving in a factory based on the unmanned vehicle driving system in a factory according to the above-described embodiments of the present invention will be described with reference to FIG. 6 below, but the subject is the autonomous driving kit 20.

Figure 6:
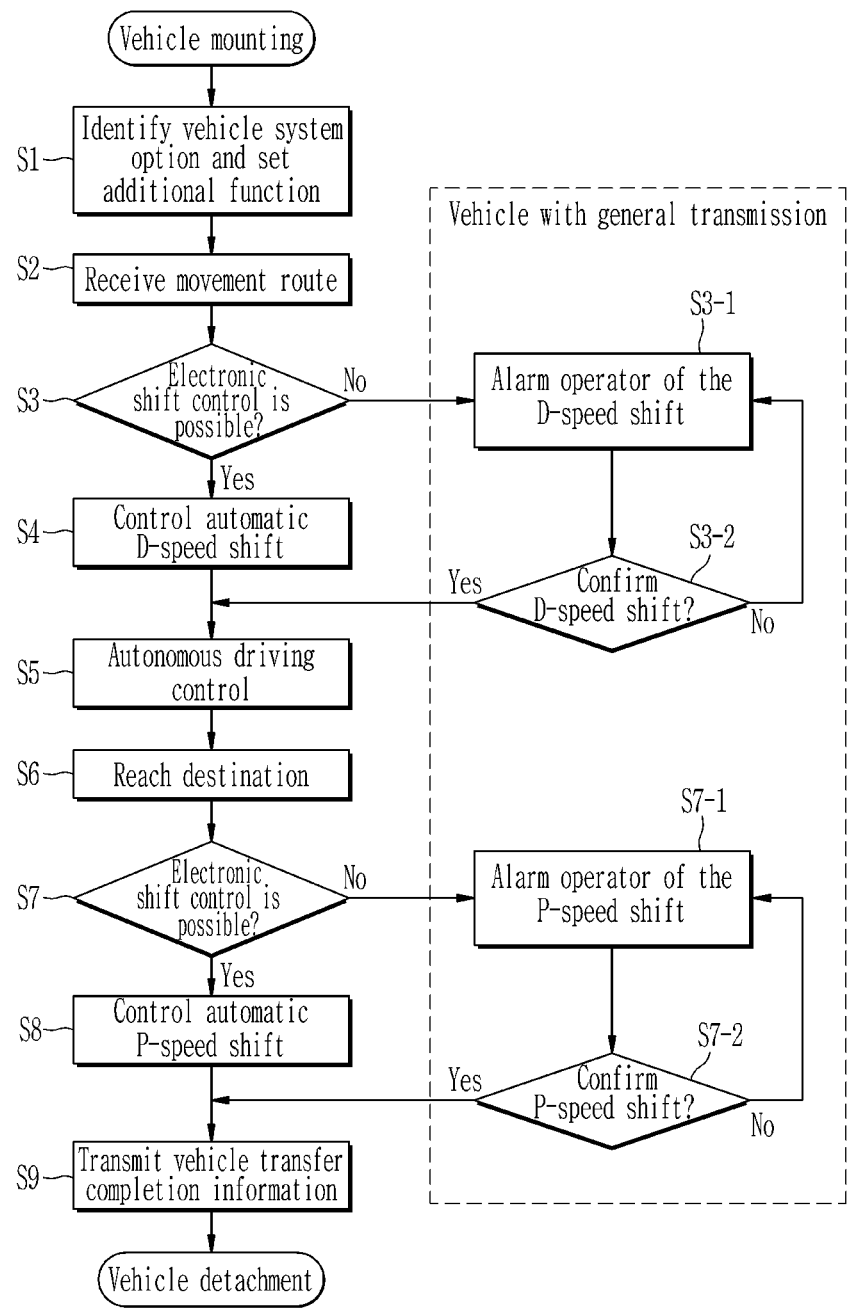
FIG. 6 shows a method for unmanned driving in a factory using an autonomous driving kit according to an exemplary embodiment of the present invention.

Referring to FIG. 6, a method for unmanned driving in a factory according to an exemplary embodiment of the present invention begins in a state in which the autonomous driving kit 20 is attached to the vehicle 10, the vehicle communication with the vehicle communication unit 11 and the communication of the control server 30 are connected, respectively.

The autonomous driving kit 20 identifies vehicle system options of the attached vehicle 10 through the vehicle communication unit 11 and sets an additional function insufficient for autonomous driving control in the autonomous driving sensor unit 25 (S1). At this time, the autonomous driving kit 20 selectively activates at least one of the V2X module 251, the camera module 252, the LIDAR module 253, and the location recognition module 254 as an additional function of the vehicle system. In addition, the autonomous driving control unit 26 may calibrate the attachment state and calibrate the control state of the autonomous driving kit 20.

When the vehicle system and additional functions are set, the autonomous driving kit 20 transmits a standby signal to the control server 30 and receives a movement route from the control server 30 (S2).

From here on, the autonomous driving kit 20 applies the unmanned driving control method differently according to the presence or absence of the electronic TCU in the identified vehicle system.

For example, an unmanned driving control method of a vehicle to which the electronic TCU is applied will be described.

If an electronic TCU exists in the vehicle system and electronic shift control is possible (S3; Yes), the autonomous driving kit 20 applies a driving signal to control the automatic D-speed shift (S4).

The autonomous driving kit 20 releases the brake, initiates autonomous driving control through cooperative control with the vehicle system, and transfers the vehicle 10 to a destination determined by the movement route (S5). The autonomous driving kit 20 controls the vehicle 10 through cooperative control of the vehicle system and additional functions, and this can utilize a known unmanned autonomous driving control mechanism.

The autonomous driving kit 20 measures the vehicle location through high-precision map data (MAP) in the factory and indoor/outdoor high-precision location information acquired through the location recognition module 254 to determine that the vehicle has reached the destination (S6). At this time, the autonomous driving kit 20 may refer to the location information received from the control server 30 that monitors the moving state of the vehicle 10 through the infrastructure of the camera 32 in the factory.

If an electronic TCU exists in the vehicle system and electronic shift control is possible (S7; Yes), the autonomous driving kit 20 applies a parking signal to control the automatic P-speed shift (S8).

The autonomous driving kit 20 transmits vehicle transfer completion information to the control server 30 and receives a response message confirmed by monitoring from the control server 30 (S9). Thereafter, the autonomous driving kit 20 is detached from the vehicle upon completion of the vehicle transfer.

On the other hand, after step S2, an unmanned driving control method of a general mechanical transmission control vehicle to which the electronic TCU is not applied will be described.

When the electronic shift control is impossible (S3; No), the autonomous driving kit 20 operates the alarm unit 23 to alarm the operator of the D shift (S3-1).

When the D-speed shift of the vehicle transmission is confirmed from the collected state information (S3-2; Yes), the autonomous driving kit 20 starts the autonomous driving control and transfers the vehicle 10 to the destination determined by the movement route (S5).

When the vehicle 10 reaches the destination (S6) and electronic shift control is impossible (S7; No), the autonomous driving kit 20 operates the alarm unit 23 to alarm the operator of the P-speed shift (S7-1).

When the P-speed shift of the vehicle transmission is confirmed from the collected state information (S7-2; Yes), the autonomous driving kit 20 transmits the vehicle transfer completion information to the control server 30. And, upon receiving the response message, the vehicle completes the transfer (S9).

After the vehicle transfer is completed, the autonomous driving kit 20 may further perform vehicle transfer for a subsequent process, and is detached and collected from the vehicle when it reaches the final transfer destination where all processes have been completed.

As described above, according to an embodiment of the present invention, by attaching an autonomous driving kit to a general vehicle and transporting it to a predetermined destination through unmanned autonomous driving adapted to multiple vehicle types and options, manpower and costs for production and logistics operations are reduced.

In addition, it is possible to prevent vehicle damage due to negligence of driving by existing workers by monitoring the moving state of the vehicle in the control server and controlling the vehicle's movement status in an emergency situation.

In addition, by operating a plurality of autonomous driving kits, there is an effect of solving the problem of delaying vehicle transport even with less manpower than before.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for unmanned driving of a vehicle not equipped with an autonomous driving function in a factory, the system comprising:
    an autonomous driving kit comprising a detachable terminal having a modularized autonomous driving sensor and configured to support the autonomous driving function of the vehicle, the autonomous driving kit configured to control a vehicle system that includes various controllers and various sensors applied to the vehicle through a vehicle communication unit of the vehicle and to control autonomous driving adapted to multiple vehicle types and options for each vehicle through cooperative control of the vehicle system and the autonomous driving sensor, wherein the autonomous driving kit is configured to:
        calibrate an attachment state by adjusting an angle of a camera module to a reference zero point of a vehicle body based on the vehicle type and the option when the autonomous driving kit is attached to the vehicle,
        recognize left and right headlamps of the vehicle through the camera module, and
        correct a center of the vehicle to match the reference zero point of the vehicle body, and
    a control server comprising a transmission/reception unit configured to conduct wireless communication with the autonomous driving kit and the vehicle communication unit through antennas disposed in the factory, the antennas being disposed in a wheel alignment process line, a standby process line, and a roll and brake process line, respectively, wherein the control server is configured to:
        recognize the vehicle to which the autonomous driving kit is attached,
        provide a moving route of the vehicle,
        collect a moving state and surrounding conditions of the vehicle based on image information of cameras arranged in the factory; and
        transmit the moving route, the moving state, and the surrounding conditions of the vehicle to the autonomous driving kit; and
        perform a control state calibration for compensating an error in a vehicle control command by comparing the vehicle control command transmitted to the autonomous driving kit and the moving state of the vehicle measured by image information of the camera module.

2. The system of claim 1, wherein the autonomous driving kit further comprises:
    a vehicle connection unit configured to connect vehicle communication with the vehicle communication unit of the vehicle;
    a server connection unit connected to the control server and configured to transmit and receive data;
    an alarm unit configured to express an event situation occurring during autonomous driving of the vehicle to a worker;
    a state information detection unit configured to recognize an option of the vehicle system and select and activate an additional function insufficient for autonomous driving control by the autonomous driving sensor; and
    an autonomous driving control unit configured to control operation of the vehicle connection unit, the server connection unit, the alarm unit, and the state information detection unit to provide the autonomous driving function based on vehicle type and an option of the vehicle.

3. The system of claim 2, wherein the autonomous driving kit further comprises:
    a housing;
    an attachment unit attached to an upper surface of a roof of the vehicle through a plurality of magnets by a bracket made to fit a curve of the roof of each vehicle and on which the housing is seated; and
    an angle adjustment unit configured to adjust an angle of a camera module left and right through an actuator connected to a motor and a gear inside the housing.

4. The system of claim 2, wherein the vehicle communication unit is configured to:
    collect state information of various sensors in the vehicle and transmit the state information to the autonomous driving kit; and
    transmit an autonomous driving control signal received from the autonomous driving kit to MDPS (Motor Driven Power Steering), ECS (Electronic Control Suspension), and at least one controller of ESC (Electronic Stability Control) and electronic TCU (Transmission Control Unit).

5. The system of claim 2, wherein the server connection unit is configured to transmit a wireless OBD ID of the vehicle obtained from the vehicle communication unit to the control server and receive the vehicle type and the option of the vehicle matched with the wireless OBD ID.

6. The system of claim 2, wherein the autonomous driving sensor comprises:
    a V2X module comprising at least one of vehicle-to-vehicle communication (V2V), vehicle-to-infrastructure communication (V2I), and vehicle-to-mobile device communication (V2N) for autonomous driving control;

a camera module configured to recognize an obstacle and a road environment in front of the vehicle through image recognition technology;

a LIDAR module configured to radiate a laser to measure a distance to obstacles around the vehicle; and a position recognition module configured to measure indoor and outdoor vehicle positions using at least one of a Differential Global Positioning System (DGPS) and an Ultra-Wideband (UWB).

7. The system of claim 6, wherein the state information detection unit is configured to actively utilize various sensors that can be used for autonomous driving control in the vehicle system, wherein for insufficient functions, each module of the autonomous driving sensor is selectively utilized.

8. The system of claim 7, wherein the state information detection unit is configured to collect vehicle state information collected from various sensors of the vehicle system and information detected by driving a selected module of the autonomous driving sensor and transmit the collected information to the autonomous driving control unit.

9. The system of claim 1, wherein the autonomous driving control unit is configured to initiate autonomous driving control through cooperative control with the vehicle system, transfer the vehicle to a destination determined by a movement route when the movement route is received from the control server, and transmit transfer completion information to the control server upon the vehicle reaching the destination.

10. The system of claim 1, wherein the control server comprises:

an interface unit connected to the camera and facilities in the factory and configured to collect infrastructure information;

a database (DB) configured to match and store a vehicle model, option information and a wireless OBD ID based on a vehicle identification number (VIN) of the vehicle, and to store information generated according to an operation of the autonomous driving kit; and a central processing unit configured to recognize the vehicle attached through communication with the autonomous driving kit, generate current location information of the vehicle and a movement path according to a process step, and transmit the information to the autonomous driving kit.

11. The system of claim 10, wherein the central processing unit is configured to collect image information of the camera photographing a top view in the factory and monitor the moving state of the vehicle based on image sensing.

12. A method for unmanned driving of a vehicle using an autonomous driving kit for unmanned transportation of general vehicles produced in a factory that includes a plurality of antennas disposed in a wheel alignment process line, a standby process line, a roll and brake process line, respectively, the method comprising:

(a) attaching the autonomous driving kit to the vehicle, identifying a vehicle system option through a vehicle communication unit, and setting an additional function insufficient for autonomous driving control in an autonomous driving sensor unit;

(b) performing attachment state calibration including recognizing left and right headlamps of the vehicle through a camera module and correcting a center to a reference zero point of a vehicle body;

(c) performing a control state calibration including compensating an error of a vehicle control command by comparing the vehicle control command and an actual vehicle movement state through a pre-driving test with a control server;

(d) receiving a movement route from the control server via at least one of the antennas and, if an electronic transmission control unit (TCU) exists in a vehicle system, applying a driving signal to control a D-speed shift;

(e) releasing a brake and initiating autonomous driving control through cooperative control of the vehicle system and the autonomous driving sensor unit; and (f) applying a parking signal to the electronic TCU when reaching a destination determined by the movement route to control a P-speed shift.

13. The method of claim 12, wherein step (a) comprises selectively activating at least one of a V2X module, a camera module, a LIDAR module, and a location recognition module as the additional function.

14. The method of claim 13, wherein step (f) comprises measuring a location of indoor and outdoor vehicles acquired through the location recognition module including map data in the factory and DGPS (Differential Global Positioning System) or UWB (Ultra-Wideband) to determine that the destination has been reached.

15. The method of claim 12, wherein step (d) comprises:
alarming a D-speed shift to an operator by operating an alarm unit if electronic shift control is impossible because the electronic TCU is not present; and
checking the D-speed shift of a vehicle transmission from vehicle state information.

16. The method of claim 15, wherein step (f) comprises:
operating the alarm unit to alarm the operator of the P-speed shift; and
checking the P-speed shift of the vehicle transmission from vehicle state information.

17. The method of claim 16, further comprising, after step (f), transmitting complete vehicle transfer information to the control server, and completing vehicle transfer upon receiving a response message confirmed by monitoring a vehicle movement state.

18. A system for unmanned driving of a vehicle not equipped with an autonomous driving function in a factory, the system comprising:

an autonomous driving kit comprising a detachable terminal having a modularized autonomous driving sensor and configured to support the autonomous driving function of the vehicle, the autonomous driving kit configured to control a vehicle system that includes various controllers and various sensors applied to the vehicle through a vehicle communication unit of the vehicle and to control autonomous driving adapted to multiple vehicle types and options for each vehicle through cooperative control of the vehicle system and the autonomous driving sensor, wherein the autonomous driving kit is configured to:

calibrate an attachment state by adjusting an angle of a camera module to a reference zero point of a vehicle body based on the vehicle type and the option when the autonomous driving kit is attached to the vehicle, recognize left and right headlamps of the vehicle through the camera module, correct a center of the vehicle to match the reference zero point of the vehicle body, express an event situation occurring during autonomous driving of the vehicle to a worker, and recognize an option of the vehicle system and select and activate an additional function insufficient for autonomous driving control by the autonomous driving sensor; and a control server comprising a transmission/reception unit configured to conduct wireless communication with the autonomous driving kit and the vehicle communication unit through antennas disposed in the factory, the antennas being disposed in a wheel alignment process line, a standby process line, and a roll and brake process line, respectively, wherein the control server is configured to:

recognize the vehicle to which the autonomous driving kit is attached, provide a moving route of the vehicle, collect a moving state and surrounding conditions of the vehicle based on image information of cameras arranged in the factory; and use the transmission/reception unit to transmit the moving route, the moving state, and the surrounding conditions of the vehicle to the autonomous driving kit; and perform a control state calibration for compensating an error in a vehicle control command by comparing the vehicle control command transmitted to the autonomous driving kit and the moving state of the vehicle measured by image information of the camera module.

19. The system of claim 18, wherein the control server comprises:

an interface unit connected to the camera and facilities in the factory and configured to collect infrastructure information;

a database (DB) configured to match and store a vehicle model, option information and a wireless OBD ID based on a vehicle identification number (VIN) of the vehicle, and to store information generated according to an operation of the autonomous driving kit; and a central processing unit configured to recognize the vehicle attached through communication with the autonomous driving kit, generate current location information of the vehicle and a movement path according to a process step, and transmit the information to the autonomous driving kit.

20. The system of claim 19, wherein the central processing unit is configured to collect image information of the camera photographing a top view in the factory and monitor the moving state of the vehicle based on image sensing.

* * * * *